US010851262B2

(12) United States Patent
Crombie et al.

(10) Patent No.: US 10,851,262 B2
(45) Date of Patent: Dec. 1, 2020

(54) PRIMER FOR DIGITAL PRINTING

(71) Applicant: SUN CHEMICAL CORPORATION, Parsippany, NJ (US)

(72) Inventors: Brian Crombie, Wallasey (GB); Joanne Guite, Rixton (GB); Peter Salthouse, Knutsford (GB); Thierry Frinault, Congleton (GB)

(73) Assignee: Sun Chemical Corporation, Parsippany, NJ (US)

( * ) Notice: Subject to any disclaimer, the term of this patent is extended or adjusted under 35 U.S.C. 154(b) by 121 days.

(21) Appl. No.: 15/577,900

(22) PCT Filed: May 27, 2016

(86) PCT No.: PCT/US2016/034594
§ 371 (c)(1),
(2) Date: Nov. 29, 2017

(87) PCT Pub. No.: WO2016/196267
PCT Pub. Date: Dec. 8, 2016

(65) Prior Publication Data
US 2018/0163086 A1 Jun. 14, 2018

Related U.S. Application Data

(60) Provisional application No. 62/170,299, filed on Jun. 3, 2015.

(51) Int. Cl.
| | | |
|---|---|---|
| *C09D 175/04* | (2006.01) | |
| *B41M 5/00* | (2006.01) | |
| *B41M 5/52* | (2006.01) | |
| *C08F 283/00* | (2006.01) | |
| *C09D 133/04* | (2006.01) | |
| *C09D 5/00* | (2006.01) | |
| *C08F 220/18* | (2006.01) | |
| *C08F 212/08* | (2006.01) | |
| *C08F 220/06* | (2006.01) | |
| *C08K 3/36* | (2006.01) | |
| *C08K 5/00* | (2006.01) | |

(52) U.S. Cl.
CPC ......... *C09D 175/04* (2013.01); *B41M 5/0017* (2013.01); *B41M 5/52* (2013.01); *B41M 5/5281* (2013.01); *C08F 283/006* (2013.01); *C09D 5/002* (2013.01); *C09D 133/04* (2013.01); *B41M 5/5245* (2013.01); *C08F 212/08* (2013.01); *C08F 220/06* (2013.01); *C08F 220/18* (2013.01); *C08F 220/1804* (2020.02); *C08K 3/36* (2013.01); *C08K 5/0091* (2013.01)

(58) Field of Classification Search
CPC .. C09D 133/00; C09D 133/04; C09D 133/06; C09D 175/04; C09D 175/06; C09D 175/08; B41M 5/0017; B41M 5/5281
See application file for complete search history.

(56) References Cited

U.S. PATENT DOCUMENTS

| | | | |
|---|---|---|---|
| 4,614,683 A * | 9/1986 | Barsotti | C08G 18/4202 428/220 |
| 5,407,771 A | 4/1995 | Landa et al. | |
| 5,817,435 A | 10/1998 | Hatch et al. | |
| 6,057,400 A | 5/2000 | Kinney et al. | |
| 6,210,758 B1 * | 4/2001 | McNeil | B05D 7/57 427/409 |
| 6,437,036 B1 * | 8/2002 | Gessner | C08G 18/0819 427/388.3 |
| 7,470,736 B2 | 12/2008 | Cooper | |
| 7,767,294 B2 | 8/2010 | Cooper | |
| 8,198,353 B2 | 6/2012 | Cooper | |
| 8,216,666 B2 * | 7/2012 | Warner | B41M 5/52 428/195.1 |
| 2002/0042469 A1 | 4/2002 | Grandhee | |
| 2004/0018344 A1 * | 1/2004 | Watkins | G02B 1/105 428/156 |
| 2004/0119804 A1 | 6/2004 | Emslander | |
| 2006/0115632 A1 * | 6/2006 | Jones | G03G 7/0013 428/195.1 |
| 2008/0166485 A1 * | 7/2008 | Steenwinkel | C08F 283/006 427/385.5 |

(Continued)

FOREIGN PATENT DOCUMENTS

| | | | | |
|---|---|---|---|---|
| CN | 104073137 A | * | 10/2014 | |
| DE | 2749691 A1 | * | 5/1979 | ........... C09D 133/14 |

(Continued)

OTHER PUBLICATIONS

Machine translated English language equivalent of CN-104073137 (Oct. 2014, 7 pages).*
Machine translated English language equivalent of JP 2000-168250 (Jun. 2000, 12 pages).*
Google translation of JP 3242595 (2001, 6 pages).*
Translation of PCT/JP2014/071906, which is the Application No. for WO 2015/029878 (2014, 25 pages).*
Allnex (UV/EB Curable Resins Product Guide. allnex, 2018, 19 pages).*

(Continued)

*Primary Examiner* — Brieann R Johnston
(74) *Attorney, Agent, or Firm* — Marian E. Fundytus; Ostrolenk Faber LLP.

(57) ABSTRACT

The present invention is directed to primer coatings that enhance the adhesion of liquid digital printing inks and toners to the substrate. The coatings comprise one or more polyurethane dispersions and one or more acrylic emulsions. The coatings of the present invention improve resistance to mineral oils, such as those typically found in liquid digital printing inks and toners. The primer coatings of the invention also reduce blocking, so that a primer coated reel of substrate may be easily unrolled, even after having been stored in the rolled reel for an extended period of time.

17 Claims, No Drawings

(56) References Cited

U.S. PATENT DOCUMENTS

| | | | |
|---|---|---|---|
| 2011/0109712 A1 | 5/2011 | Grant et al. | |
| 2012/0010327 A1* | 1/2012 | Jing | C08J 3/215 |
| | | | 523/223 |
| 2014/0308447 A1* | 10/2014 | Sarkisian | B41M 5/0011 |
| | | | 427/261 |
| 2015/0166829 A1 | 6/2015 | Koger et al. | |
| 2018/0105699 A1* | 4/2018 | Yan | C09D 5/002 |

FOREIGN PATENT DOCUMENTS

| | | | | |
|---|---|---|---|---|
| EP | 1 914 282 A1 | 4/2008 | | |
| EP | 2 468 782 A1 | 6/2012 | | |
| EP | 2 657 308 A1 | 10/2013 | | |
| JP | 2000168250 A * | 6/2000 | | |
| JP | 3242595 B2 * | 12/2001 | | |
| WO | WO 01/36551 A1 | 5/2001 | | |
| WO | WO-2004060687 A1 * | 7/2004 | | B41M 5/52 |
| WO | WO 2009/126133 A1 | 10/2009 | | |
| WO | PCT/CN2015/075145 | * | 3/2015 | |
| WO | WO-2015029878 A1 * | 3/2015 | | |

OTHER PUBLICATIONS (Minimum Film Forming Temperature Bar: Operating Instructions, Rhopoint Instrumentation, 2019, 15 pages, specifically p. 2).*
Machine translation of DE-2749691-A1 (1979, 5 pages).*
International Preliminary Report on Patentability issued in International Application No. PCT/US2016/034594, dated. Dec. 5, 2017.
Induprint Se 197" Product Specification Sheet (Indulor Chemie GmbH) Aug. 21, 2003.
Joncryl 538-A Safety Data Sheet (BASF Corporation) Feb. 25, 2015.
International Search Report issued in International Application No. PCT/US2016/034594, dated Aug. 22, 2016.
Written Opinion of the International Searching Authority issued in International Application No. PCT/US2016/034594, dated Aug. 22, 2016.
Extended European Search Report issued in counterpart EP Application No. 16 804 104.4, dated Oct. 30, 2018.

* cited by examiner

PRIMER FOR DIGITAL PRINTING

CROSS REFERENCE TO RELATED APPLICATIONS

The present application is a § 371 National Phase application based on PCT/US2016/034594 filed May 27, 2016, which claims the benefit of U.S. Provisional Application No. 62/170,299, filed Jun. 3, 2015 the subject matter of each of which is incorporated by reference in their entirety.

FIELD OF THE INVENTION

The present invention relates generally to a water-based ink or coating composition useful as a primer on various substrates. The primer enhances adhesion of a printing ink to the substrate. Substrates include digitally printed substrates. The substrates include polymeric substrates, paper, and board.

BACKGROUND

Recently, the use of digital printing using liquid electrophotographic systems has grown substantially. Printers using this type of technology are commercially available. One such printer is available from Hewlett-Packard Company, under the trade name of HP Indigo. In this printing technique, liquid toner images are formed on a photosensitive drum and then electrically transferred onto an intermediate blanket for printing on a web or sheet substrates. Details of a toner and liquid composition, and the use thereof, are described in U.S. Pat. No. 5,407,771. This is just one example of such a digital printer, and the inks and coatings of the invention could be used on any such digital printer.

In recent years, many printer coatings have been used to provide good liquid toner adhesion to a variety of polymeric filmic substrates. For example, U.S. Pat. No. 8,198,353 discloses primer compositions comprising a copolymer of ethylene/acrylic acid or ethylene/methacrylic acid, and a hydrogenated rosin or rosin ester. U.S. Pat. Nos. 7,767,294 and 7,470,736 describe primer compositions comprising a copolymer of ethylene/acrylic acid or ethylene/methacrylic acid, mixed with a polyurethane dispersion, and a hydrocarbon resin.

However, there is still a need in the art for a primer coating which gives good consistent liquid toner adhesion to a wide variety of polymeric substrates where there is minimal deterioration of adhesion bond strength with time.

SUMMARY OF THE INVENTION

The present invention provides primers with a formulation that gives stable print adhesion on a variety of substrates with aging, and at high humidity. The primers can also be printed on polymeric films with lower surface energy than is typically required for good adhesion. In addition, there is preferably no requirement to add an anti-blocking agent. The formulation preferably comprises at least two polyurethane dispersions, one primarily to enhance adhesion, and one to aid in digital ink transfer. The acrylic emulsions that are included in the primers preferably self-crosslink to improve overall properties, in particular mineral oil (e.g. Isopar) resistance and blocking resistance.

In a particular aspect, the present invention provides a primer coating for enhancing adhesion of a digital liquid printing ink or toner to a substrate, comprising:
a) 20 wt % to 90 wt % of one or more polyurethane dispersions, based on the total weight of the primer; and
b) 10 wt % to 30 wt % of one or more self-crosslinking acrylic emulsions, based on the total weight of the primer.

In a particular aspect, the present invention provides a method of enhancing adhesion of a digital liquid printing toner or ink to a substrate, comprising:
a) providing a substrate;
b) applying onto the substrate a primer coating of the invention;
c) drying the applied primer coating;
d) applying a digital liquid printing ink or toner onto the dried primer coating; and
e) drying the applied digital liquid ink or toner.

DETAILED DESCRIPTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

The present invention is the first time that it has been shown that the use of solely polyurethane/acrylic emulsions for primers in digital printing provide improved adhesion and resistance properties. The technical advantages of these primers will be shown. One advantage of the primers of the present invention is that when overprinted with inks comprising mineral oils, such as Isopar paraffinic materials, improved adhesion of the primer to the substrate, and of the ink or toner to the primed substrate, is shown, compared to currently known primers.

Liquid digital printing inks and toners are typically formulated with mineral oils. However, the mineral oil (e.g. Isopar) in overprinted digital liquid printing inks and toners may solubilize the primer on the coating, reducing adhesion of the primer, and thus the ink or toner, to the substrate. This is often seen with commercially available primers, such as DigiPrime 4431. The primer coatings of the present invention are resistant to solubilization by mineral oil, thus imparting improved adhesion of the primer and overprinted digital ink to the substrate.

Embodiments of the present invention meet the aforementioned requirements, providing a primer coating yielding consistent good toner adhesion where there is no loss of adhesion with time or high humidity, on a wide range of substrates, such as polyethylene terephthalate (PET), orientated polypropylene (OPP), polyamide (PA), polyvinylchloride (PVC), polyethylene (PE), paper, and board. There is also an improvement in the anti-blocking characteristics without the need for a specific additive, whilst there is no loss in the other physical properties required for primer use in digital printing.

In a particular aspect, the present invention provides a primer coating for enhancing adhesion of a digital liquid printing ink or toner to a substrate, comprising:
 a) 20 wt % to 90 wt % of one or more polyurethane dispersions, based on the total weight of the primer; and
 b) 10 wt % to 30 wt % of one or more self-crosslinking acrylic emulsions, based on the total weight of the primer.

In a particular aspect, the present invention provides a method of enhancing adhesion of a digital liquid printing toner or ink to a substrate, comprising:
 a) providing a substrate;
 b) applying onto the substrate the primer coating of the invention;
 c) drying the applied primer coating;
 d) applying a digital liquid printing ink or toner onto the dried primer coating; and
 e) drying the applied digital liquid ink or toner.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

Throughout this disclosure, all parts and percentages are by weight (wt % or mass % based on the total weight) and all temperatures are in ° C. unless otherwise indicated.

The terms "primer," "primer coating," and "primer coating composition" are used interchangeably.

Primer Inks and Coatings

The primers of the invention are usually printed or coated on a filmic substrate which has been flame or corona treated prior to coating. These primers can be coated onto the substrate either offline or online immediately prior to digital printing. When printed offline, there is no deterioration of the primer with time with regard to either substrate adhesion or digital print receptability.

The primer coatings of the present invention have a major advantage over the prior art, in that when digitally printed, there is no loss of adhesion of the ink to the primer coated substrate with either time or high humidity. Problems with blocking are also alleviated. The prior art primers, based either on polyethyleneimine or ethylene acrylic acid, overcome each of the above problems individually, but neither can alleviate both, as can the primers of the present invention.

The primer coating preferably comprises at least one polyurethane dispersion, with at least one self-crosslinking acrylic emulsion. In certain embodiments, the primer coatings of the invention comprise two or more polyurethane dispersions, and/or two or more self-crosslinking acrylic emulsions. In one embodiment, the polyurethane dispersions comprise a blend of two or more polyurethane dispersions, with at least one polyester polyurethane and at least one polyether polyurethane. This combination of dispersions and emulsions exhibits good adhesion to polymeric substrates, as well as to ethylenic polymers, which are typical binders used in liquid toner compositions. This combination also has a sufficient degree of tack, so that the image is removed from the printing blanket, and transferred to the primed substrate, under normal operating temperatures of around 130° C. However, when the substrate is rolled up, there is preferably no blocking in the reel. This is particularly important when the primer coating is coated on the substrate off-line, and then the substrate is digitally printed at a later date.

In certain embodiments, the one or more polyurethane dispersions are present in an amount of 20 wt % to 90 wt %, based on the total weight of the primer coating composition. For example, the one or more polyurethane dispersions may be present in an amount of about 30 wt % to about 90 wt %; or from about 40 wt % to about 90 wt %; or from about 50 wt % to about 85 wt %; or from about 50 wt % to about 80 wt %; or from about 50 wt % to about 75 wt %; or from about 55 wt % to about 75 wt %. The polyurethane dispersions typically have a solids content from about 30 wt % to about 45 wt %. For example, the polyurethane dispersions may have a solids content of about 40 wt %.

In certain embodiments, two or more polyurethane dispersions are selected such that at least one is chosen that imparts better adhesion values, and at least one is chosen to impart better digital ink transfer. The polyurethane chosen to impart better adhesion preferably has a glass transition temperature (Tg) less than or equal −50° C. For example, the polyurethane chosen to impart better adhesion may have a Tg of about −50° C.; or of about −55° C.; or of about −59° C. The polyurethane chosen to provide better digital ink transfer preferably has a Tg between −80° C. to −60° C. For example, the polyurethane can have a Tg of about −75° C.; or about −70° C.; or about −65° C. Examples of suitable commercially available polyurethane dispersions include, but are not limited to, U400N, U3251, U8001 and U2101, all from Alberdingk; and Neorez R600, from DSM; combinations thereof, and the like.

In certain embodiments, the one or more self-crosslinking acrylic emulsions are present in an amount of about 10 wt % to about 30 wt %, based on the total weight of the primer. For example, the one or more acrylic emulsions may be present in an amount of from about 10 wt % to about 25 wt %; or from about 10 wt % to about 20 wt %; or from about 12 wt % to about 25 wt %; or from about 15 wt % to about 20 wt %. The self-crosslinking acrylic emulsions typically have a solids content of from about 30% to about 55%.

In certain embodiments, the acrylic may be selected from self-crosslinking acrylic emulsions having a Tg above 25° C.

For example, the acrylic emulsion may have a Tg between about 25° C. to about 70° C.; or from about 25° C. to about 65° C.; or from about 25° C. to about 60° C.; or from about 25° C. to about 55° C.; or from about 30° C. to about 50° C. Self-crosslinking acrylics with a Tg lower than 25° C. were found to lack the resistance properties required, particularly with respect to mineral oils, such as those contained in Isopar. In certain embodiments, the primer may contain self-crosslinking acrylics having a Tg outside the preferred range. In such cases, the self-crosslinking acrylics having a Tg outside the preferred range are present in an amount of less than 15%; or less than 10%; or less than 5%, or less than 2%. In certain embodiments, the primers of the present invention are substantially free of self-crosslinking acrylic emulsions having a Tg outside the preferred ranges.

The self-crosslinking acrylics include, but are not limited to, the following main monomers: methyl acrylic acid (MAA), methyl methacrylate (MMA), butyl acrylate, butyl methacrylate, styrene, methyl styrene, combinations thereof, and the like. Suitable self-crosslinking acrylic emulsions include, but are not limited to, AC 2714VP (from Alberdingk); Plextol DV 544, and Plextol DV 585, (from Synthomer); Neocryl XK12 and Neocryl XK14 (from DSM); combinations thereof; and the like.

Solvents, particularly water, may optionally be added to the primer. Suitable solvents include, but are not limited to, water, aliphatic hydrocarbons, cyclic hydrocarbons, aromatic hydrocarbons, ketones, aldehydes alcohols, ethers, including glycol ethers, esters, combinations thereof and the like. Addition of solvents aids in achieving the required dry coating weight, and also to aid in flow. Solvents may be present in the primer in an amount of 0 wt % to about 30 wt %, based on the total weight of the primer coating composition. For example, solvents may be present in an amount of about 0.1 wt % to about 30 wt %; or from about 1.5 wt % to about 30 wt %; or from about 0.5 wt % to about 25 wt %; or from about 0.5 wt % to about 20 wt %; or from about 0.5 wt % to about 10 wt %; or from about 1 wt % to about 30 wt %; or from about 1 wt % to about 25 wt %; or from about 1 wt % to about 20 wt %; or from about 1 wt % to about 10 wt %.

In certain embodiments, the solvents comprise a mixture of water and other solvents. It is preferred that in such a mixture, water is present in an amount of greater than or equal 50 wt %, based on the total weight of the solvents. For example, water may be present in an amount of about 50 wt % to about 100 wt %; or from about 55 wt % to about 95 wt %; or from about 60 wt % to about 90 wt %; or from about 70 wt % to about 80 wt %, based on the total weight of the solvents.

In certain embodiments, the primer coating includes one or more antifoam additives (e.g. Tego Foamex 3062, 1488, etc. available from Evonik). The antifoam additives are present in an amount of 0 wt % to 3.0 wt %, based on the total weight of the primer coating composition. For example, the antifoam additives may be present in an amount of 0.1 wt % to about 2.5 wt %; or from 0.1 wt % to about 2.0 wt %; or from about 0.3 wt % to about 2 wt %; or from about 0.4 wt % to about 1 wt %. For example, the one or more antifoam additives can be present in an amount of about 0.5 wt %. In certain embodiments, the primer coating includes one or more anti-bacterial agents (e.g. Acticide MBS (Thor Chemicals); JMAC LP10 (Clariant)). The anti-bacterial agents are present in an amount of about 0 wt % to about 0.5 wt %, based on the total weight of the primer coating composition. For example, the antibacterial agents may be present in an amount of about 0.1 wt % to about 0.5 wt %; or from about 0.1 wt % to about 0.3 wt %. For example, the anti-bacterial agents can be present in an amount of about 0.25 wt %.

In certain embodiments, no additional anti-blocking agent is required, because the formulation of the primer has inherent good anti-blocking characteristics. However, it would be possible to incorporate common anti-blocking agents, such as waxes, silica, metal hydrides, and others which are well known anti-blocking agents. When used, anti-blocking agents are typically present in an amount of 0.5 wt % to 5.0 wt %, based on the total weight of the primer coating composition. For example anti-blocking agents may be present in an amount of about 0.5 wt % to about 4.5 wt %; or from about 0.5 wt % to about 4 wt %; or from about 0.5 wt % to about 3.0 wt %; or from about 1 wt % to about 4.5 wt %; or from about 1 wt % to about 3 wt %.

In certain embodiments, the primers of the invention may also optionally contain one or more colorants. Colorants may be incorporated as color concentrates, flushes, liquid dyes, powders, etc. Suitable colorants include, but are not limited to, organic or inorganic pigments, and dyes. The dyes include, but are limited to, azo dyes, anthraquinone dyes, xanthene dyes, azine dyes, combinations thereof, and the like. Organic pigments may be one pigment or a combination of pigments. Suitable organic pigments include, but are not limited to, Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments include, but are not limited to, iron oxides, titanium dioxides, chromium oxides, ferric ammonium ferrocyanides, ferric oxide blacks, Pigment Black Number 7 and/or Pigment White Numbers 6 and 7. Other organic and inorganic pigments, and dyes, can also be employed, as well as combinations that achieve the colors desired. If used, it is preferred that the colorants be incorporated in relatively small amounts (e.g. less than 10 wt %; or less than 5 wt %).

When priming polymeric film substrates, the substrate would preferably be flame or corona treated immediately prior to coating. Such treatment of the substrate enables good adhesion of the primer by providing a suitable surface energy of the substrate. In general, higher surface energy is associated with better adhesion. An advantage of the present invention is that good adhesion of the primer to the substrate can be achieved when the substrate has a surface energy as low as about 38 dynes/cm. Most prior art primers require a substrate having at least 40 dynes/cm, such as from about 40 to 53 dynes/cm, to achieve good adhesion of the primer.

The primer coating may be applied to the substrate using any suitable method. Such methods include, but are not limited to, flexographic printing, gravure coating, Meyer bar and roller coating, and screen printing. Typically, the primer coating is applied to the substrate such that, when dried, it forms a continuous coating weight of 0.5 to 1.5 g/m².

EXAMPLES

The following examples illustrate specific aspects of the present invention, and are not intended to limit the scope thereof in any respect and should not be so construed.

Test Methods

Coating of Substrate

Primer formulations were applied to PET film (12 micron film from Coveme, ref: EMP/E), having a surface energy of 38 dynes/cm. The formulations were applied using a Meyer bar, and applying a coating of 6 microns wet. The coating was dried using hot air.

A commercially available primer, Michelman DigiPrime 4431, was used as a comparative example.

Adhesion

The primed substrate was laid on a flat surface. Scapa tape 1112 was applied to the sample using a smooth even motion without wrinkling the tape or sample (see ASTM F2252). A 300 mm length of tape was applied to the sample and a roller was applied to smooth the tape. One end of the tape was folded back at a 90° angle, and 25 mm of tape was pulled from the sample. The sample was placed into a fixture clamped to the moving jaw of the adhesion tester (Testometric, model M350-5CT) so that it maintained a pulling angle of 90° during the peeling of the next 75 mm of tape. The free end of the tape was placed into the other jaw. The moving jaw was operated at 150 mm/min (see generally ASTM D3330, Test Method F). Force was measured in g/25 mm. The lowest force at which primer was transferred from the substrate to the tape was recorded as the value for adhesion. The reported value is an average value of three samples. A higher value indicates better adhesion of the primer to the substrate. The adhesion test was performed right after the printed sample was dried (Initial); adhesion was tested again after 24 hours and 3 days.

Adhesion After Isopar Coating 1 g of Isopar mineral oil was placed on top of the primed substrate, spread over 90 cm², and left for 30 minutes. Adhesion was tested as described above.

Blocking

The samples were placed in a Laboratory Graseby Specac 15 ton press, either face to face A-A (i.e. coated side to coated side), or face to back A-B (i.e. uncoated side of film to primer coated side). A pressure of 10 MPa was applied at room temperature. The face to back A-B configuration represents the blocking when the substrate coated with primer on one side is rolled up in a reel. The samples were then tested generally using the test conditions of ASTM D3330, Test Method F (see above for adhesion), except that no tape was involved. Rather, the force to pull the samples apart was measured. The samples tested were the result of the two surfaces being pressed together in the press (with no adhesive). Blocking values were measured as g/25 mm. The minimum force (in g/25 mm) required to pull apart the samples was taken as the blocking value. Higher values indicate that more force is necessary, meaning that the samples are strongly stuck together, and thus there is blocking. Lower values mean the samples are not strongly stuck together, and there will be less blocking, enabling the primed substrate to be rolled into a reel and used at a later time.

Print Receptability

This test was devised to give an indication of digital print receptability in the laboratory, with physical printing. HP Indigo print (Cyan and Magenta) was heat transferred to the primer coat. Transfer conditions were 130° C., at 20 psi, for 1 second. This is representative of the conditions of the HP Indigo press.

The samples of the primer coated substrate with the ink transferred were subsequently scanned in "gray scale," and analyzed using Adobe Photoshop (version CS). Greyscale images are distinct from one-bit bi-tonal black-and-white images, which in the context of computer imaging are images with only the two colors, black and white (also called bi-level or binary images). Greyscale images have many shades of grey in between black and white. Greyscale images (as photographs) intended for visual display (both on screen and printed) are commonly stored with 8 bits per sampled pixel, which allows 256 different intensities (i.e. shades of grey) to be recorded. The print intensities, expressed as a shade of grey, were measured using Adobe Photoshop CS, thus giving a numerical value. A brightness scale was used, wherein 255=white (i.e. no ink transferred), and a score of 0=black. Thus, the lower the brightness score, the more ink that was transferred to the primed substrate, which is the desired result.

Materials

Polyurethane dispersion=a 50:50 mixture of Alberdingk U400N (Tg=−80° C.) and U3251 (Tg=−58° C.).

Self-crosslinking acrylic emulsion=Neocryl XK14 (Tg=42° C.).

Example 1: Primer Coating Containing Polyurethane Dispersion and Self-Crosslinking Acrylic Emulsion A primer coating containing both polyurethane dispersion and self-crosslinking acrylic emulsion was prepared according to the formulation shown in Table 1.

TABLE 1

Example 1 Primer Formulation

| Material | Weight % composition |
| --- | --- |
| Polyurethane dispersion | 72 |
| Acrylic emulsion | 18 |
| Water | 10 |
| Total | 100 |

The Example 1 primer was coated on a PET substrate and tested as described above. The results are shown in Table 2.

TABLE 2

Example 1 Primer Test Results

| Test | Invention primer (Example 1) | DigiPrime 4431 |
|---|---|---|
| *Adhesion | | |
| Initial | 610 | 596 |
| 24 hours | 658 | 635 |
| 3 days | 740 | 887 |
| *Blocking | | |
| A-A | 70 | 100 |
| A-B | 18 | 58 |
| *Adhesion after Isopar | | |
| Initial | 81 | 20 |
| 24 hours | 686 | 70 |
| 3 days | 686 | 60 |
| Grey scale ink transfer | | |
| Initial | | |
| Cyan | 154 | 156 |
| Magenta | 128 | 132 |
| After 24 hours | | |
| Cyan | 154 | 151 |
| Magenta | 138 | 133 |
| After 3 days | | |
| Cyan | 154 | 150 |
| Magenta | 141 | 161 |

As shown in Table 2, the degree of transfer between the Example 1 primer and the comparative DigiPrime 4431 primer is similar. However, the major differences are in the blocking and adhesion after Isopar coating, where the Example 1 primer exhibits better results. Coating the primed substrate with Isopar models overprinting with HP Indigo inks. The higher adhesion values after Isopar coating for the Example 1 primer compared to the DigiPrime 4431 primer indicates that the primers of the invention would provide better adhesion during printing. Furthermore, there is no deterioration of adhesion after aging for the Example 1 primer, while there is significant deterioration of adhesion after aging for DigiPrime 4431 primer. This indicates that the primers of the invention are resistant to solubilization by mineral oils.

Example 2. Primer Coating Containing Only Polyurethane Dispersion

Comparative Example 2, containing only polyurethane dispersion (i.e. no self-crosslinking acrylic emulsion) was prepared as shown in Table 3.

TABLE 3

Example 2 Primer Formulation

| Material | Weight % composition |
|---|---|
| Polyurethane dispersion | 90 |
| Water | 10 |
| Total | 100 |

The Example 2 primer was coated on a PET substrate and tested as described above. The results are shown in Tables 4 and 5.

TABLE 4

Adhesion Test Results for Example 1, Comparative Example 2, and Comparative DigiPrime 4431

| Test | Inventive primer Inv. Example 1 | Polyurethane (no acrylic) Comp. Example 2 | Comparative DigiPrime 4431 |
|---|---|---|---|
| Adhesion after Isopar | | | |
| Initial | 81 | 19 | 20 |
| 24 hours | 686 | 509 | 70 |
| 3 days | 686 | 358 | 60 |

The results in Table 4 show that adhesion after Isopar coating is not as good in Comparative Example 2, containing only polyurethane dispersions, and no acrylic, compared to Example 1. However, the adhesion after aging for both Example 1 and Example 2 are better than the adhesion for DigiPrime 4431.

TABLE 5

Blocking Test Results for Example 1, Comparative Example 2, and Comparative DigiPrime 4431

| Test | Inv. primer Example 1 | Polyurethane (no acrylic) Comp. Example 2 | DigiPrime 4431 |
|---|---|---|---|
| Blocking A-B | 18 | 50 | 58 |

The results in Table 5 show that Example 1 primer has lower values for blocking (A-B) than both the Comparative Example 2 primer and Comparative DigiPrime 4431 primer. This demonstrates the importance of including the acrylic emulsion in the primer. Without the acrylic, the A-B blocking value is considerably higher (worse) and is very similar to the value obtained for the commercially available primer DigiPrime 4431. The lower values in blocking are beneficial, because this corresponds to anti-blocking in the reel when the substrate is coated with primer. This is extremely important when the primer is coated onto the substrate off-line, the substrate is rolled, and the substrate is subsequently digitally printed at a later time, where even and consistent unwind is crucial.

Example 3. Primer Coating Containing Only Acrylic Emulsion

Comparative Example 3, containing only acrylic emulsion (i.e. no polyurethane dispersion) was prepared as shown in Table 6.

TABLE 6

Example 3 Primer Formulation

| Material | Weight % composition |
|---|---|
| Acrylic dispersion | 90 |
| Water | 10 |

Ink transfer onto substrates coated with each of primers Example 1, Comparative Example 2, and Comparative Example 3 was tested as described above. The results are shown in Table 7.

TABLE 7

Greyscale Ink Transfer

| Test | Inv. Primer Example 1 | 100% Polyurethane Comp. Example 2 | 100% Acrylic Comp. Example 3 |
|---|---|---|---|
| | | Grey scale ink transfer | |
| Initial | | | |
| Cyan | 154 | 156 | 251 |
| Magenta | 128 | 139 | 247 |
| After 24 hours | | | |
| Cyan | 154 | 160 | 252 |
| Magenta | 138 | 144 | 247 |
| After 3 days | | | |
| Cyan | 154 | 152 | 250 |
| Magenta | 141 | 143 | 248 |

The results in Table 7 show that a mixture of polyurethane dispersion and acrylic emulsion in the primer is important to achieve good ink transfer to the primed substrate. The ink transfer values for the polyurethane and acrylic as single components are shown. For ink transfer, the lower the value the better, as described above. The acrylic emulsion formulation always gives a higher value, indicating a low ink transfer value from the blanket.

Examples 4A to 4E. Primer Coatings Containing Varying Amounts of Polyurethane Dispersions and Acrylic Emulsions Examples 4A to 4E were prepared, containing increasing amounts of acrylic emulsion, with concomitant decreasing amounts of polyurethane dispersion. As described above, the addition of the acrylic emulsion to the formulation of the primers has been shown to be beneficial to the Isopar (mineral oil) resistance, but detrimental to the ink transfer. However, both of these properties are integral properties for the primer. Acrylic emulsion was included in an amount of from 10 wt % to 30 wt % (with respective amounts of polyurethane dispersion of 80 wt % to 60 wt %, the balance being water). The formulations are shown in Table 8.

TABLE 8

Examples 4A to 4E Primer Formulations

| Material | Example 4A | Example 4B | Example 4C | Example 4D | Example 4E |
|---|---|---|---|---|---|
| Polyurethane dispersion | 80 | 76 | 70 | 65 | 60 |
| Acrylic dispersion | 10 | 14 | 20 | 25 | 30 |
| Water | 10 | 10 | 10 | 10 | 10 |
| Total | 100 | 100 | 100 | 100 | 100 |

Greyscale ink transfer for Examples 4A to 4E was assessed as described above. The results are shown in Table 9.

TABLE 9

Greyscale ink transfer to Examples 4A to 4E

| Test | Ex. 2 0% acrylic | Ex. 4A 10% acrylic | Ex. 4B 14% acrylic | Ex. 1 18% acrylic | Ex. 4C 20% acrylic | Ex. 4D 25% acrylic | Ex. 4E 30% acrylic | DigiPrime 4431 |
|---|---|---|---|---|---|---|---|---|
| | | | | Grey scale ink transfer | | | | |
| Initial | | | | | | | | |
| Cyan | 156 | 158 | 156 | 154 | 157 | 174 | 194 | 156 |
| Magenta | 139 | 140 | 137 | 128 | 139 | 168 | 203 | 132 |
| 24 hr. | | | | | | | | |
| Cyan | 160 | 160 | 156 | 154 | 160 | 178 | 199 | 151 |
| Magenta | 144 | 138 | 140 | 138 | 137 | 169 | 187 | 133 |
| 3 days | | | | | | | | |
| Cyan | 152 | 160 | 162 | 154 | 160 | 170 | 190 | 150 |
| Magenta | 143 | 145 | 143 | 141 | 139 | 155 | 188 | 161 |

The results in Table 9 show that the primers of the invention can include up to 30% acrylic, having good resistance to Isopar (mineral oil), while maintaining acceptable greyscale ink transfer properties. Lower numerical values are more beneficial, indicating a better ink transfer. It is known that the currently available primer, DigiPrime 4431, transfers well. The results in Table 9 indicate that the primers of the invention give similar results for transfer.

The adhesion was also tested for the primers listed in Table 9. The results are shown in Table 10 below.

TABLE 10

Adhesion values

| | Standard Adhesion | | | Isopar Adhesion | | |
|---|---|---|---|---|---|---|
| | Initial | 24 hours | 3 days | Initial | 24 hours | 3 days |
| Ex. 2 0% acrylic | 410 | 598 | 442 | 19 | 509 | 358 |
| Ex. 4A 10% acrylic | 511 | 567 | 650 | 85 | 650 | 636 |
| Ex. 4B 14% acrylic | 624 | 643 | 658 | 90 | 637 | 630 |
| Ex. 1 18% acrylic | 610 | 658 | 740 | 81 | 686 | 686 |
| Ex. 4C 20% acrylic | 680 | 638 | 548 | 140 | 655 | 519 |
| Ex. 4D 25% acrylic | 637 | 625 | 570 | 120 | 600 | 510 |

TABLE 10-continued

| | Adhesion values | | | | | |
|---|---|---|---|---|---|---|
| | Standard Adhesion | | | Isopar Adhesion | | |
| | Initial | 24 hours | 3 days | Initial | 24 hours | 3 days |
| Ex. 4E 30% acrylic | 617 | 552 | 597 | 111 | 540 | 496 |
| DigiPrime 4431 | 596 | 635 | 687 | 20 | 70 | 60 |

Table 10 shows the adhesion values, both Standard and after Isopar coating, for primers of the invention containing varying amounts of acrylic, comparing them to DigiPrime 4431. For the Standard adhesion, there is no major difference between the primers of the invention and DigiPrime 4431. However, the primers of the invention have significantly better adhesion after Isopar coating, compared to DigiPrime 4431. Initial adhesion is often low because residual Isopar is on the surface of the sample; over time the Isopar evaporates. If there is no adhesion failure between the substrate and the primer, the adhesion value will increase above 400 g/25 mm as the residual Isopar is removed (i.e. evaporates). If adhesion between the substrate and the primer fails, the adhesion values remain low (i.e. less than 100 g/25 mm).

The primers were tested in the blocking test as described above. Both A-A and A-B configurations were tested. The results are shown in Table 11 below.

TABLE 11

| | Blocking results | | | | | | | |
|---|---|---|---|---|---|---|---|---|
| Test | Ex. 2 0% acrylic | Ex. 4A 10% acrylic | Ex. 4B 14% acrylic | Ex. 1 18% acrylic | Ex. 4C 20% acrylic | Ex. 4D 25% acrylic | Ex. 4E 30% acrylic | DigiPrime 4431 |
| | | | | Blocking | | | | |
| A-A | 157 | 120 | 90 | 70 | 66 | 54 | 43 | 100 |
| A-B | 26 | 27 | 24 | 18 | 18 | 17 | 17 | 58 |

The most interesting results are the A-B results, which models the potential blocking in the reel when it is rolled up after primer printing. Examples 4A to 4E and 1, containing a mixture of polyurethane dispersion and acrylic emulsion, show better blocking results (i.e. lower values) than a primer with no acrylic, and better than DigiPrime 4431. As previously discussed, the presence of the acrylic reduces the incidence of blocking.

The present results show that the primer coatings of the invention enhance adhesion of the primer and the ink to the substrate; improve resistance to mineral oils, such as those typically found in liquid digital printing inks; and reduce blocking of a primer coated substrate that is rolled.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A primer coating for enhancing adhesion of a digital liquid printing ink or toner to a substrate comprising:
    a) 45 wt % to 85 wt % of one or more polyurethane dispersions, based on the total weight of the primer; and
    b) 10 wt % to 30 wt % of one or more self-crosslinking acrylic emulsions, based on the total weight of the primer; and wherein the glass transition temperature (Tg) of the polyurethane is less than −55° C.; and wherein at least one self-crosslinking acrylic has a Tg above 25° C.

2. The primer coating of claim 1, further comprising one or more additional solvents.

3. The primer coating of claim 2, wherein at least one of the one or more additional solvents is water.

4. The primer coating of claim 2, wherein the one or more additional solvents are present in an amount of 0.1 wt % to 30 wt %, based on the total weight of the primer.

5. The primer coating of claim 1, comprising two or more polyurethane dispersions.

6. The primer coating of claim 5, wherein the two or more polyurethane dispersions comprise at least one polyester polyurethane and at least one polyether urethane.

7. The primer coating of claim 1, comprising at least one polyurethane having a Tg between −80° C. and −60° C.

8. The primer coating of claim 1, comprising at least one self-crosslinking acrylic having a Tg in the range of 25° C. to 70° C.

9. The primer coating of claim 1, comprising at least one self-crosslinking acrylic having a Tg in the range of 30° C. to 50° C.

10. The primer coating of claim 1, further comprising one or more additives independently selected from the group consisting of one or more antifoam additives, one or more anti-bacterial agents, and one or more colorants.

11. The primer coating of claim 10, wherein the one or more additives are present in an amount of 0.1 wt % to 3 wt %.

12. The primer coating of claim 1, further comprising one or more anti-blocking agents.

13. The primer coating of claim 12, wherein the one or more anti-blocking agents are present in an amount of 0.5 wt % to 5 wt %.

14. The primer coating of claim 12, wherein the one or more anti-blocking agents are independently selected from the group consisting of waxes, silica, metal anhydrides, and combinations thereof.

15. A printed article comprising the primer coating of claim 1.

16. A method of priming a substrate, comprising applying the primer coating of claim 1, and drying the primer coating.

17. A method of enhancing adhesion of a digital liquid printing toner or ink to a substrate, comprising:
    a) providing a substrate;
    b) applying onto the substrate the primer coating of claim 1;
    c) drying the applied primer coating;
    d) applying a digital liquid printing ink or toner onto the dried primer coating; and
    e) drying the applied digital liquid ink or toner.

* * * * *